JAMES M. SPANGLER, OF CANTON, OHIO.

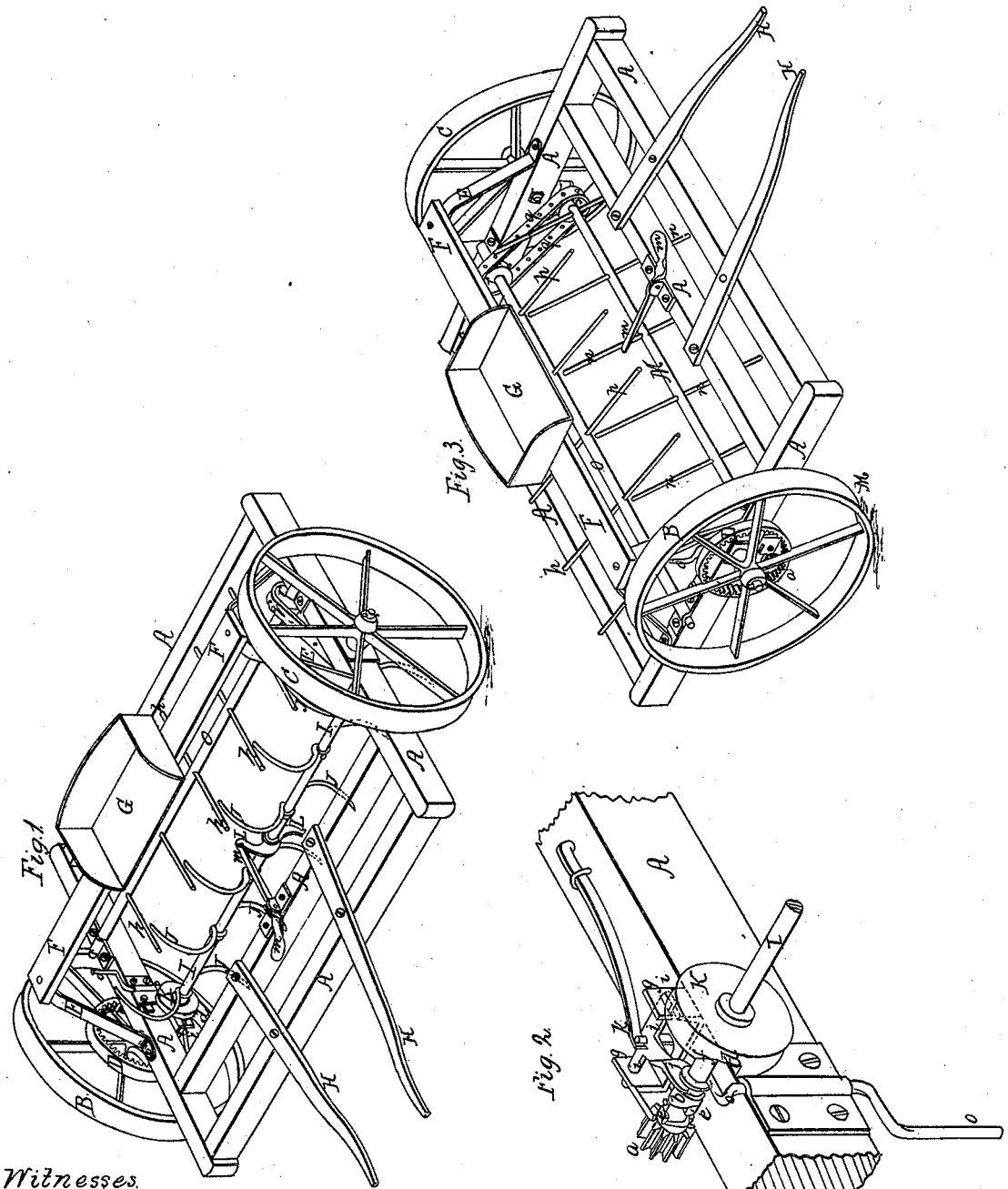

Letters Patent No. 87,982, dated March 16, 1869.

IMPROVEMENT IN COMBINED HORSE-RAKE AND HAY-SPREADER.

The Schedule referred to in these Letters Patent and making part of the same.

To all whom it may concern:

Be it known that I, JAMES M. SPANGLER, of Canton, in the county of Stark, and State of Ohio, have invented certain new and useful Improvements in Horse Hay-Rakes and Hay-Turners, or Tedders; and I do hereby declare the following to be a full, clear, and exact description of the same, reference being had to the accompanying drawings, making a part of this specification, in which—

Figure 1 represents a perspective view of the machine, as used in raking hay into windrows.

Figure 2 represents an enlarged view of the connecting and disconnecting, or clutch-and-gear arrangement, for driving or stopping the rake, at the will of the driver, in his seat.

Figure 3 represents the machine as transposed into a hay-turner, or tedder, by substituting another shaft for the rake and its shaft.

Similar letters of reference, where they occur in the separate figures, denote like parts of the machine in all of the drawings.

My invention relates to a horse hay-rake, in which the rake is automatically turned and stopped, and which is set in motion for tripping the load upon its tines, by the driver operating a catch-lever, and the load upon the tines starting the rotation of the rake, which works the clutch and connects the pinion with the main drive-wheel, and revolves the rake a half revolution, when it is thrown out of gear, and again stopped and held.

To enable others skilled in the art to make and use my invention, I will proceed to describe the same with reference to the drawings.

A is a rectangular main frame, supported upon two carrying-wheels, B C, of which the former, B, is a drive-wheel, having connected with it an internal-cogged gear D.

Upon supports E, on the main frame, is placed a cross-bar, F, and upon this cross-bar is placed the driver's seat G.

The machine is drawn by the shafts H, to which the horse or team is hitched.

Underneath the main frame is supported, in suitable bearings, a rake-shaft, I, upon which there is a series of curved tines, J, to form a gathering-rake, on diametrically-opposite sides of said shaft.

Upon that end of the rake-shaft next to the drive-wheel B, there is a loose pinion, a, that runs in the internal-gear wheel D, and is driven by it; and upon the hub, or collar of this pinion, there is a shoulder, or semi-clutch c, against which the shoulder e, on the clutch b, takes at times, so as to cause the pinion to turn the shaft I, instead of turning on said shaft, as will be explained.

On the shaft I there is a disk, or wheel K, in the face of which, and at diametrically-opposite points, are formed recesses d, and inclined planes f leading from them.

On the frame A are arranged supports g g, in which a sliding shipper-bar, i, is placed and moved, the shipper j, on said bar, straddling the clutch b, which clutch can move longitudinally on the shaft I, but always turns with the shaft.

The shipper j and shipper-bar i are moved in one direction, viz, toward the disk K, by the reaction, or recoil of a spring, k, and when the recesses d come opposite the shipper-bar i, the latter is forced into said recesses, and throws the clutch out of connection with the pinion, and stops the rotation of the rake-shaft I.

At the moment when the shipper is thrown into one of the recesses, one of the ends of the cross-head L comes against a pivoted foot-lever, m, and holds the shaft and rake from turning, said rake being held, with one set of its tines, in the proper position for gathering up and carrying the hay along upon the tines, or rolling it along ahead of the tines, or both.

When the windrow has been reached, or the rake is to be relieved of its load, the driver, with his foot, releases the cross-head from the foot-lever, by pressing upon the latter, and the weight, or load upon the tines, by its inertia, and the forward motion of the machine, revolves or moves the rake a small distance, sufficient for the inclined plane f to move the shipper-bar, and shipper, and clutch, and thus connect the rake with the internal gear D which turns it, until the next recess d, on the disk K, comes opposite the shipper-bar i, when the latter is thrown into said recess by the spring k, and the rake is stopped and locked again. While the face of the disk K is against the shipper-bar, or the latter bears against the surface of the disk, the gears are in mesh, and the shaft turns; but when the recess comes opposite the bar i, then the gears are thrown out, and the rake is stopped and locked by the cross-head and foot-lever, as above described.

When the hay-rake is to be converted into a hay-turner, or tedder, the rake-shaft I is removed, and another shaft, M, with straight tines n, is inserted in its place.

The shaft M has upon its end a pinion, a, and a clutch like those on the shaft I, and as seen in fig. 2, but has not the spring-shipper i, or the disk K, upon it.

In place, however, of the shipper and disk, there is a turning-lever, o, by which the clutch can be connected with the pinion, and the shaft be continuously driven from the internal gear D, except when going to or from the field, when it can be thrown out of connection, and the hay-turners stopped in their rotation.

On the frame is supported a shaft, O, which has a series of straight tines, p, upon or through it, and this shaft O and its tines are rotated from the driven shafts M or I, by means of a punctured endless belt, q, and sprocket, or spiked pulleys r s, on the respective shafts.

In this transformation of the machine, the foot-lever is not used.

The construction of the shafts is such as that they, and their co-operative parts, may be readily and expeditiously removed, and replaced by each other, as occasion may require, for making, and then for raking the hay into windrows.

In turning the hay, the tines on the revolving shaft M lift up the hay, while those on the shaft O turn it over.

Having thus fully described my invention,

What I claim therein as new, and desire to secure by Letters Patent, is—

In combination with a revolving rake-shaft and rake, the disk-wheel K, with its recesses and planes, and the spring-shipper, for throwing said rake into and out of gear with the drive-wheel, substantially as described.

JAMES M. SPANGLER.

Witnesses:
A. PONTRUS,
WILLIAM A. SPANG.